United States Patent [19]

Demzin

[11] 4,388,878
[45] Jun. 21, 1983

[54] MULTIPLE DEPOSITION TYPE SEEDER FOOT ASSEMBLY

[76] Inventor: Fred W. Demzin, R.R. #1, Regina, Saskatchewan, Canada

[21] Appl. No.: 312,631

[22] Filed: Oct. 19, 1981

[51] Int. Cl.³ .............................................. A01C 5/00
[52] U.S. Cl. .................................... 111/86; 111/73
[58] Field of Search ............... 172/699, 700, 765, 770, 172/771, 721, 731, 732, 768; 111/6, 7, 70, 71, 73, 80, 86, 1, 85, 84, 34

[56] References Cited

U.S. PATENT DOCUMENTS

| | | | |
|---|---|---|---|
| 3,158,958 | 6/1962 | Gould | 111/1 X |
| 3,851,489 | 12/1974 | Richardson | 172/699 |
| 4,116,139 | 9/1978 | Sauer | 111/86 X |
| 4,248,548 | 2/1981 | Danford | 111/7 X |
| 4,257,340 | 3/1981 | Mickelsson et al. | 111/1 |
| 4,276,836 | 7/1981 | Pust | 111/86 |
| 4,341,168 | 7/1982 | Siebert | 111/7 |

FOREIGN PATENT DOCUMENTS

| | | | |
|---|---|---|---|
| 530673 | 9/1956 | Canada | 111/7 |
| 432698 | 8/1926 | Fed. Rep. of Germany | 111/85 |
| 35151 | 1/1965 | Fed. Rep. of Germany | 111/7 |
| 556906 | 10/1943 | United Kingdom | 111/6 |
| 121609 | 4/1958 | U.S.S.R. | 111/73 |
| 136598 | 3/1960 | U.S.S.R. | 111/86 |

Primary Examiner—James R. Feyrer
Assistant Examiner—Danton DeMille
Attorney, Agent, or Firm—Stanley G. Ade

[57] ABSTRACT

A seeder foot is shaped to open a furrow and to facilitate immediate initial filling thereof as soon as the foot has passed. A plurality of feed tubes are situated immediately behind the foot, one above the other, with the lowermost one extending rearwardly more than the next succeeding one and the next succeeding tube extending rearwardly further than the tube thereabove. These tubes are vertically spaced apart thus enabling a layer of soil to cover the material discharging from the tubes so that the layers of soil separate the materials one from the other. The lowermost tube may discharge granular or liquid fertilizer, the next tube may discharge seed grain and the uppermost tube may discharge a granular herbicide.

18 Claims, 5 Drawing Figures

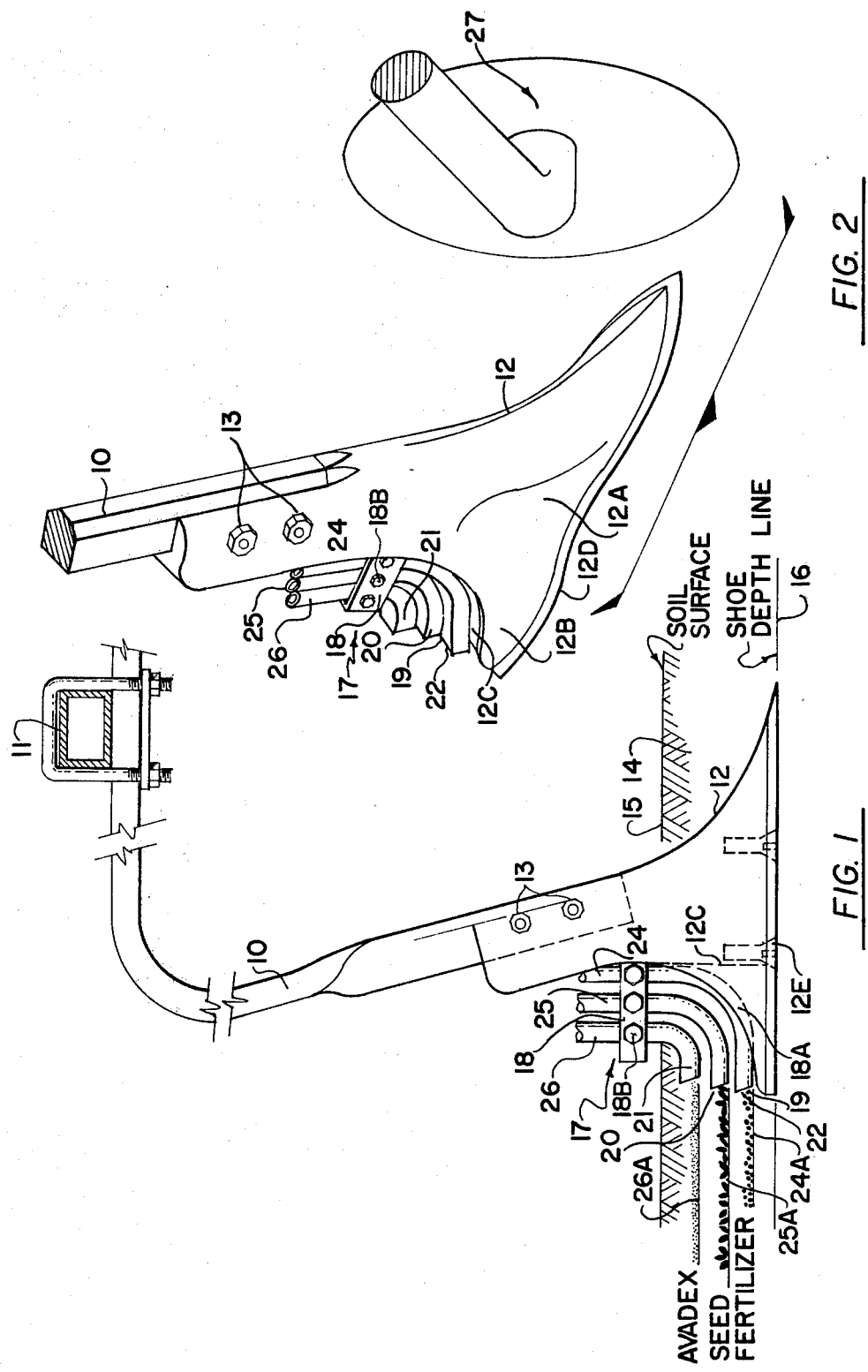

MULTIPLE DEPOSITION TYPE SEEDER FOOT ASSEMBLY

BACKGROUND OF THE INVENTION

This invention relates to new and useful improvements in attachments to cultivators, air seeders, press drills, drills and the like.

Conventionally, seed and/or fertilizer are fed down common tubes to be deposited together and unsegregated or side by side (side-banding) within the furrow behind, between or beside the soil opening device or devices. It is understood that the soil opening device forms the necessary furrow or opening.

However, it is difficult to deposit the seed, fertilizer and herbicide at the correct levels or positions and, if the fertilizer or herbicide is too close to the seed, burning and killing may occur during germination of the seed and initial growth stages.

The present invention overcomes these disadvantages and in accordance with the invention there is provided a seeder foot assembly attachable to a shank or the like, said seeder foot assembly comprising in combination a furrow opening body portion including a leading front end and a trailing rear side and at least two feeder tubes on the rear side, said tubes each including a substantially horizontal discharge portion one above the other in spaced apart relationship, each horizontal discharge portion including a rearwardly facing discharge end, the discharge end of the lowermost horizontal discharge portion extending rearwardly of the discharge end of the horizontal discharge portion immediately thereabove, said seeder foot assembly including means to initiate substantial closing of the furrow immediately behind said seeder foot assembly.

Another advantage of the invention is to provide a device of the character herewithin described which may use two or three feed tubes secured or cast within the seeder foot casting or assembly with the tubes curving rearwardly and, in the case of three such tubes being connected respectively, for example, to fertilizer at the lowermost discharge, to seed grain for the immediate discharge and to a herbicide such as Avadex (registered trade mark) to the uppermost feed tube. Avadex is a granular herbicide for controlling wild oats. The individual levels of the outlets of these tubes may be adjusted so that the materials may be deposited at the correct relationship one to the other.

Within the seeder foot assembly provisions are also incorporated to divide or split the flow of either the seed or fertilizer so that either the seed or fertilizer may be side-banded in two flow streams of material without changing the level of placement. The end results of this modification aids and abets further separation of seed and harmful chemicals to further enhance the germination and plant development. This is accomplished by simply manifolding the single tube to accommodate two delivery openings instead of one single aperture while maintaining the same level of placement in the soil.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 1 is a schematic side elevation of a seeder foot with the invention secured thereto.

FIG. 2 is an isometric view showing the seeder foot in relation to the coulter.

In the drawings like characters of reference indicate corresponding parts in the different figures.

DESCRIPTION

Figure 3:
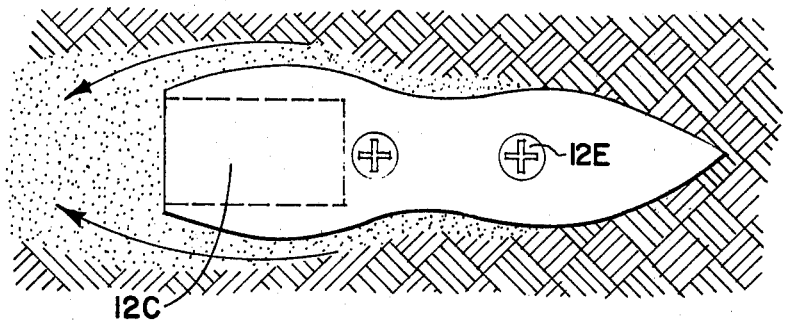
FIG. 3 is an underside view of the seeder foot per se.

Proceeding therefore to describe the invention in detail, reference character 10 illustrates the rearwardly curved cultivator shank secured to a transverse frame member 11 in a conventional manner.

A seeder foot 12 is secured to the lower end of the shank by means of nut and bolt assemblies 13 or other similar conventional means and forms a furrow shown schematically by reference character 14, below the soil line or level 15, with reference character 16 illustrating the base of the furrow.

A plurality of feed tubes collectively designated 17 is secured to the rear of the seeder foot by means of clamps 18 secured to the rear of the foot and extending around the tubes and the lower or discharge ends of these tubes curve rearwardly as indicated by reference character 18A with the lowermost tube extending rearwardly as at 19, a greater amount than the middle tube shown as 20 which in turn extends rearwardly a greater amount than the upper tube 21. All three tubes are cut off at the rear ends at an angle indicated by reference character 22 which slopes downwardly and forwardly relative to the direction of travel indicated by reference character 23.

The clamps 18 and clamp bolts 18B engaging through the clamps and bearing against the tubes, permit the three tubes to be adjusted vertically with relation to one another and it is desirable that fertilizer be connected to the lowermost tube specifically designated 24, seed grain be connected to the middle tube 24, and a granular herbicide such as Avadex be connected to the uppermost tube 26.

By this arrangement, the fertilizer is deposited and if desired, banded on the base of the furrow as indicated by reference character 24A, the seed grain is deposited spaced thereabove as indicated by reference character 25A, and the herbicide spaced above at the uppermost level as indicated by 26A, it being understood that as the furrow is formed, the soil immediately falls in hence the reason for the exit points of the three tubes being one behind the other. In other words, the fertilizer is deposited first and the furrow starts to fill whereupon the grain is deposited upon this fill and the herbicide deposited upon the fill which in turn covers the grain. The remaining soil covers the herbicide and may be packed by a following packer wheel which is conventional and which is not illustrated.

The filling in of the furrow, as soon as the foot passes, is facilitated by the shape of the sole of the foot and the portion of the body portion thereabove. This is illustrated schematically in FIG. 3 and it will be seen that the forward portion of the sole plate and the body portion gradually widens to provide the initial furrow opening whereupon it narrows gradually and then widens in a gradual curve to an area just forwardly of the rear end thereof. This wider portion then gradually narrows towards the rear end so that the rear end is slightly narrower in width than the portion immediately forwardly thereof. The maximum dimensions are of course at the sole plate 12D with the dimensions of the body portion gradually diminishing upwardly in smooth curves. This forms a venturi action to the soil passing thereby and speeds up the soil immediately in contact with the sides of the furrow opener at this point thus tending to facilitate the deposition of soil back into the furrow.

The sides of the rear expanded portion 12B define an opening 12C between them which extends forwardly of the base plate or sole plate 12D. The opening extends upwardly as shown in phantom in FIG. 1 and receives the feed tubes 24, 25 and 26. The sole plate 12D is detachably secured by means of studs or bolts 12E, to the body portion. Alternatively, the entire foot may be cast in one piece depending upon design parameters.

Full flexibility is provided by the vertical adjustment of the tubes within the clamps 18 and by the initial formation of the curved lower discharge ends of the three tubes with the inclined opeings 22.

Advantages include the fact that the grain, fertilizer and herbicide is released almost horizontally and that due to the shape of the seeder foot, the soil speeds up as it passes over and around the foot thereby quickly enveloping the various levels of the granules and/or grain.

Due to the staggered relationship of the tube outlets, the granules (including the seed grain) from each tube are enveloped separately thus giving the desired vertical and physical separation.

The device permits positive depth control and placement of seed and chemicals and permits the granular herbicide to be placed above the seed or just on the surface, if desired, with the grain being placed between the herbicide and the fertilizer.

The fertilizer is placed either directly below the seed or side banded thereby eliminating the burning and possible destruction of the seedlings and also encouraging better root development.

The device is usable with either air or conventional metering methods and works particularly well under conditions of zero tillage.

It can be used readily with hoe drills, air seeders or cultivators and, if desired, anhydrous ammonia may be applied as well as liquid fertilizer through the lower delivery tube assembly either singly or dually side banded.

Also shown in FIG. 2 is a furrow opening coulter assembly collectively designated 27 which is conventional in construction and may facilitate the furrow opening by breaking up the ground immediately ahead of the seeder foot assembly.

Figure 4:
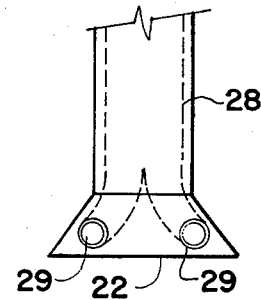
FIG. 4 is a fragmentary rear view of one embodiment of the fertilizer feed tube outlet.
Figure 5:
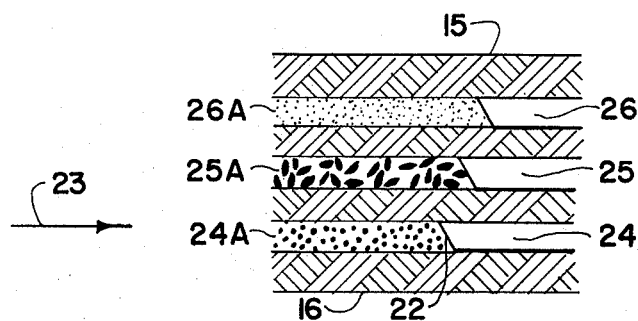
FIG. 5 is an enlarged fragmentary schematic cross sectional view of the discharge ends of the tubes within the furrow.

FIG. 4 shows an alternative construction usable particularly with the lowermost discharge end 24A in the event that side-banding of the fertilizer is required.

A saddle 28 is situated inside the discharge end dividing the discharge end into two legs each of which is provided with a discharge aperture 29. The saddle divides the fertilizer into two streams and deposits them one upon each side of the vertical axis, it being understood that the seed is then deposited above and between the two side bands of the fertilizer.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A seeder foot assembly attachable to a shank or the like, said feeder foot assembly comprising in combination a furrow opening body portion including a leading front end and a trailing rear side and at least two feeder tubes on the rear side, said tubes each including a substantially horizontal discharge portion one above the other in spaced apart relationship, each horizontal discharge portion including a rearwardly facing discharge end, the discharge end of the lowermost horizontal discharge portion extending rearwardly of the discharge end of the horizontal discharge portion immediately thereabove, said seeder foot assembly including means to initiate substantial closing of the furrow immediately behind said seeder foot assembly.

2. The assembly according to claim 1 which includes means to adjust vertically, the rear discharge ends of said horizontal discharge portions relative to one another and relative to the base of said seeder foot assembly.

3. The assembly according to claim 1 in which said discharge end of each of said tubes is cut diagonally in a direction forwardly and downwardly along a plane normal to the longitudinal axis of said horizontal discharge portion.

4. The assembly according to claim 2 in which said discharge end of each of said tubes is cut diagonally in a direction forwardly and downwardly along a plane normal to the longitudinal axis of said horizontal discharge portion.

5. The assembly according to claim 2 in which said means to adjust vertically, the discharge ends of said horizontal discharge portions includes a substantially vertical portion for each discharge tube and clamp means detachably securing said vertical portions to the rear side of said furrow opening body portion.

6. The assembly according to claim 4 in which said means to adjust vertically, the discharge ends of said horizontal discharge portions includes a substantially vertical portion for each discharge tube and clamp means detachably securing said vertical portions to the rear side of said furrow opening body portion.

7. The assembly according to claim 1 in which means to initiate substantial closing of the furrow includes a configuration of said furrow opening body portion which induces a venturi effect to the soil flowing past said portion, said configuration including widening of the furrow opening body portion just forwardly of the rear end thereof and a curving inwardly of said furrow opening body portion at the rear end thereof whereby the rear end of said furrow opening body portion particularly adjacent the base thereof is narrower in width than the portion thereof just forwardly of said rear end.

8. The assembly according to claim 2 in which means to initiate substantial closing of the furrow includes a configuration of said furrow opening body portion which induces a venturi effect to the soil flowing past said portion, said configuration including widening of the furrow opening body portion just forwardly of the rear end thereof and a curving inwardly of said furrow opening body portion at the rear end thereof whereby the rear end of said furrow opening body portion particularly adjacent the base thereof is narrower in width than the portion thereof just forwardly of said rear end.

9. The assembly according to claim 3 in which means to initiate substantial closing of the furrow includes a configuration of said furrow opening body portion which induces a venturi effect to the soil flowing past said portion, said configuration including widening of the furrow opening body portion just forwardly of the rear end thereof and a curving inwardly of said furrow opening body portion at the rear end thereof whereby the rear end of said furrow opening body portion particularly adjacent the base thereof is narrower in width than the portion thereof just forwardly of said rear end.

10. The assembly according to claim 4 in which means to initiate substantial closing of the furrow includes a configuration of said furrow opening body portion which induces a venturi effect to the soil flowing past said portion, said configuration including widening of the furrow opening body portion just forwardly of the rear end thereof and a curving inwardly of said furrow opening body portion at the rear end thereof whereby the rear end of said furrow opening body portion particularly adjacent the base thereof is narrower in width than the portion thereof just forwardly of said rear end.

11. The assembly according to claim 5 in which means to initiate substantial closing of the furrow includes a configuration of said furrow opening body portion which induces a venturi effect to the soil flowing past said portion, said configuration including widening of the furrow opening body portion just forwardly of the rear end thereof and a curving inwardly of said furrow opening body portion at the rear end thereof whereby the rear end of said furrow opening body portion particularly adjacent the base thereof is narrower in width than the portion thereof just forwardly of said rear end.

12. The assembly according to claim 6 in which means to initiate substantial closing of the furrow includes a configuration of said furrow opening body portion which induces a venturi effect to the soil flowing past said portion, said configuration including widening of the furrow opening body portion just forwardly of the rear end thereof and a curving inwardly of said furrow opening body portion at the rear end thereof whereby the rear end of said furrow opening body portion particularly adjacent the base thereof is narrower in width than the portion thereof just forwardly of said rear end.

13. The assembly according to claims 1, 2 or 3 in which said furrow opening body portion includes a body portion having a recess formed at the rear side thereof and a sole plate detachably secured to the base of said body portion and covering the base of said recess, said feeder tubes including said horizontal discharge portions thereof being contained within the recess with the discharge ends thereof terminating at or forwardly of the rear edge of said sole plate.

14. The assembly according to claims 4, 5 or 6 in which said furrow opening body portion includes a body portion having a recess formed at the rear side thereof and a sole plate detachably secured to the base of said body portion and covering the base of said recess, said feeder tubes including said horizontal discharge portions thereof being contained within the recess with the discharge ends thereof terminating at or forwardly of the rear edge of said sole plate.

15. The assembly according to claims 7, 8 or 9 in which said furrow opening body portion includes a body portion having a recess formed at the rear side thereof and a sole plate detachably secured to the base of said body portion and covering the base of said recess, said feeder tubes including said horizontal discharge portions thereof being contained within the recess with the discharge ends thereof terminating at or forwardly of the rear edge of said sole plate.

16. The assembly according to claims 10, 11 or 12 in which said furrow opening body portion includes a body portion having a recess formed at the rear side thereof and a sole plate detachably secured to the base of said body portion and covering the base of said recess, said feeder tubes including said horizontal discharge portions thereof being contained within the recess with the discharge ends thereof terminating at or forwardly of the rear edge of said sole plate.

17. The assembly according to claims 1, 2 or 3 which includes three feeder tubes on the rear side thereof, said each tube including a substantially horizontal discharge portion one above the other in spaced apart relationship, and a vertical portion communicating with and extending upwardly from each horizontal discharge portion, each horizontal discharge portion including a rear facing discharge end, the discharge end of the lowermost horizontal portion extending rearwardly of the discharge end of the discharge portion immediately above, and the discharge end of the uppermost discharge portion, terminating forwardly of the discharge end of the discharge portion immediately above the lowermost discharge portion.

18. The assebly according to claims 7, 8 or 9 which includes three feeder tubes on the rear side thereof, said each tube including a substantially horizontal discharge portion one above the other in spaced apart relationship, and a vertical portion communicating with and extending upwardly from each horizontal discharge portion, each horizontal discharge portion including a rear facing discharge end, the discharge end of the lowermost horizontal portion extending rearwardly of the discharge end of the discharge portion immediately above, and the discharge end of the uppermost discharge portion, terminating forwardly of the discharge end of the discharge portion immediately above the lowermost discharge portion.

* * * * *